United States Patent
Stahl et al.

(10) Patent No.: US 8,403,306 B2
(45) Date of Patent: Mar. 26, 2013

(54) DEVICE FOR FOAMING LIQUID FOODS IN A CONTAINER

(75) Inventors: Stefan Stahl, Zürich (CH); Corinne Keiser, Adlikon b. Regensdorf (CH); Jochen Ganz, Uster (CH); Adrian Burri, Bubikon (CH)

(73) Assignee: Niro-Plan AG, Aarburg (CH)

( * ) Notice: Subject to any disclaimer, the term of this patent is extended or adjusted under 35 U.S.C. 154(b) by 383 days.

(21) Appl. No.: 12/725,708

(22) Filed: Mar. 17, 2010

(65) Prior Publication Data

US 2010/0237517 A1      Sep. 23, 2010

(30) Foreign Application Priority Data

Mar. 19, 2009   (DE) .................. 10 2009 013 938

(51) Int. Cl.
  *B01F 3/04* (2006.01)
(52) U.S. Cl. ............... 261/77; 261/DIG. 26; 99/323.1
(58) Field of Classification Search ............. 261/77, 261/DIG. 26; 426/474; 99/323.1
See application file for complete search history.

(56) References Cited

U.S. PATENT DOCUMENTS

| | | | | |
|---|---|---|---|---|
| 2,208,028 A | * | 7/1940 | Harrington | 141/263 |
| 2,919,726 A | * | 1/1960 | Zimmermann et al. | 141/69 |
| 2,938,551 A | * | 5/1960 | Hallstein | 141/227 |
| 2,967,433 A | * | 1/1961 | Phillips | 74/16 |
| 4,342,710 A | * | 8/1982 | Adolfsson et al. | 261/121.1 |
| 5,143,607 A | * | 9/1992 | Bernhardt | 210/170.07 |
| 5,372,061 A | * | 12/1994 | Albert et al. | 99/281 |
| 5,588,471 A | * | 12/1996 | Lowe | 141/83 |
| 5,638,740 A | * | 6/1997 | Cai | 99/295 |
| 5,931,080 A | * | 8/1999 | Roure Boada | 99/293 |
| 6,293,187 B1 | * | 9/2001 | Zils | 99/323.1 |
| 6,854,381 B2 | * | 2/2005 | Fischer | 99/453 |
| 8,047,125 B2 | * | 11/2011 | Bazin et al. | 99/293 |

FOREIGN PATENT DOCUMENTS

| | | |
|---|---|---|
| EP | 0140841 | 5/1985 |
| EP | 1440648 | 7/2004 |
| EP | 2080458 | 7/2009 |
| GB | 895848 | 5/1962 |
| WO | 9423623 | 10/1994 |

\* cited by examiner

*Primary Examiner* — Charles Bushey
(74) *Attorney, Agent, or Firm* — Volpe and Koenig, P.C.

(57) ABSTRACT

A device for foaming liquid foods in a container, particularly milk, is provided having a vapor generator for generating vapors, particularly steam, and a vapor lance to be at least partially inserted into the container, with the vapor lance being connected to the vapor generator in a fluid-guiding fashion and including at least one vapor outlet opening such that steam can be discharged from the vapor generator via the vapor lance out of the vapor outlet opening. The device further includes at least one motion element which is connected to the vapor lance and/or a holder for the container such that the vapor lance and the container are movable relative to each other via the motion element.

16 Claims, 1 Drawing Sheet

US 8,403,306 B2

DEVICE FOR FOAMING LIQUID FOODS IN A CONTAINER

CROSS-REFERENCE TO RELATED APPLICATIONS

This application claims the benefit of German Patent Application No. 102009013938.9, filed Mar. 19, 2009, which is incorporated herein by reference as if fully set forth.

BACKGROUND

The invention relates to a device for foaming liquid foods in a container.

In order to foam liquid foods in a container, for example frothing milk in a cup, devices are known comprising a vapor generator and a vapor lance.

The steam generated by the vapor generator is fed into the vapor lance and here discharged via at least one vapor outlet opening. The vapor lance is introduced into a container at least partially filled with a liquid food so that the vapor outlet opening of the vapor lance is at least partially located in the liquid food and a foaming of the liquid food is achieved via the exiting steam.

Typically, such devices are integrated in automatic coffee makers, which in addition to the above-described elements also comprise a coffee maker for creating coffee and for dispensing it via a separate coffee outlet. The vapor lance is typically arranged at the automatic coffee maker in a manually articulatable fashion.

In order to create a drink such as cappuccino, which comprises foamed milk, the container is partially filled with milk and manually advanced to the automatic coffee maker so that the vapor lance and particularly the vapor outlet opening of the vapor lance is immersed in the milk. Subsequently, by the vapor generator steam is discharged from the vapor outlet opening so that a foaming of the milk occurs.

In order to achieve optimum milk froth, a certain experience of the user is necessary to optimize the distance of the vapor outlet opening from the surface of the milk or the movement of the vapor lance and thus also the vapor outlet opening within the milk for creating milk froth.

SUMMARY

The invention is based on the objective of providing a further development of the devices of prior art for foaming liquid foods in a container, which simplifies the foaming of the liquid food for the user and particularly allows an improved foaming of the liquid food, regardless of the expertise of the user.

This objective is attained in a device according to the invention, and advantageous embodiments of the device according to the invention are disclosed in the description and claims that follow.

The device according to the invention for foaming liquid foods in a container comprises a source for a foaming medium and a discharge element for said foaming medium to be at least partially inserted into the container. The discharge element is connected in a liquid-conducting fashion to the source and comprises at least one fluid outlet opening, so that the foaming medium can be discharged from the fluid outlet opening into the container.

It is essential that the device comprises at least one motion element. The motion element is connected to the discharge element and/or to the holder for the container such that at least the elevation of the fluid outlet opening of the discharge element in the container can be changed via the motion element.

Contrary to prior art, the device according to the invention comprises therefore a motion element, which allows a relative movement between the discharge element and the container and thus also between the fluid outlet opening of the discharge element and the container. If the discharge element is at least partially inserted into the container, at least one such movement can be performed by said motion element so that the elevation of the fluid outlet opening in the container can be adjusted. Therefore, via the motion element at least the immersion depth of the fluid outlet opening in the container can be increased or reduced by changing the immersion depth of the discharge element in the container. This way, at least the elevation, i.e. the vertical distance of the fluid outlet opening from the surface of any liquid located in the container can be adjusted via the motion element.

The relative movement between the container and the discharge element is therefore executed by the motion element at least with regard to a change in elevation. Preferably, a relative movement is executed via the motion element during the foaming. The scope of the invention also covers that, supplementary to a relative movement between the container and the fluid outlet opening executed manually by the user, additionally a movement or a correction of said manual movement occurs by the motion element.

The device according to the invention has the advantage that the motion element can be embodied by the manufacturer for an optimal foaming process. The user then requires no or only little expertise with regard to the optimal relative movement between the discharge element and the container so that even users lacking specialized knowledge achieve an optimal foaming using the device according to the invention.

Typically the foaming of liquid food occurs via steam, particularly the foaming of milk for the preparation of milk froth for coffee using water vapor. Advantageously the source is therefore embodied as a vapor generator, preferably a steam generator. In particular, it is advantageous to embody the discharge element in a tubular fashion, preferably in form of a conventional vapor lance.

The fluid outlet opening is advantageously arranged at the end section of the discharge element, i.e. at the end of the discharge element that is immersed in the liquid food in the container together with the discharge element.

Tests of the applicant have shown that particularly the insertion and removal of the discharge element in the liquid food, i.e. the movement of the discharge element and thus the fluid outlet opening, vertical in reference to the surface of the liquid food in the container and/or the distance of the fluid outlet opening from the surface of the liquid food in the container, is decisive for an optimal foaming process.

Advantageously the motion element is therefore connected to the discharge element and/or a fastener for the container such that the discharge element and the container can be moved in reference to each other via the motion element, at least also in the vertical direction.

Here, the scope of the invention comprises that the container is placed upon a surface of the device according to the invention and that the discharge element subsequently is at least partially inserted into the container and during the foaming process a relative movement occurs between the discharge element and the container caused by the motion element. Additionally, the scope of the invention includes that the device itself comprises a support surface for the container and/or that the support surface is embodied as a holder for the container and the motion element is connected to the holder for the container such that the container can be moved by the motion element. Therefore, the scope of the invention includes the exclusive movement of the discharge element by the motion element, the exclusive movement of a holder for the container, and the movement of both the discharge element as well as a holder for the container.

A technically simple and cost-effective embodiment of the device according to the invention is achieved when only the discharge element can be moved via the motion element and the container remains locally fixed in reference to the device according to the invention.

Advantageously, the device comprises therefore a discharge element holder, and the motion element is arranged between the discharge element holder and the discharge element such that the discharge element can be moved at least vertically in reference to the discharge element holder. In order to realize a cost-effective and robust embodiment the motion element is here advantageously embodied as a parallel guide or a linear guide.

In another advantageous embodiment the device comprises at least one passive motion element embodied as a float. The float is arranged such that it can be inserted together with the discharge element, at least partially, into the liquid food in the container such that the lift acting upon the float in the liquid food and/or in the foam also affects the discharge element. Advantageously the float is therefore arranged at the discharge element. Therefore the scope of the invention includes arranging the float at a separate holder, particularly separate levers, and that they are connected to the discharge element holder and/or the discharge element in a cooperating fashion.

Thus using the float, a distance between the surface of the liquid food in the container or the limit between the foam created and the air located thereabove and the discharge element and thus also the fluid discharge opening of the discharge element can be predetermined. Advantageously the float is therefore embodied such that the fluid outlet opening of the discharge element during the foaming process for a predetermined pressure, by which the source inserts the foaming medium into the discharge element, is arranged always at an approximately constant, predetermined distance in reference to the limit between the liquid food in the container and the froth created or to the limit between the froth created and the air located thereabove.

In order to allow the volume of the float to be kept small it is advantageous for the discharge element to be arranged at the discharge element holder, in an at least vertically articulate fashion via at least one holding arm, and for the discharge element holder to comprise a weight compensation element, which is embodied cooperating with the holding arm such that the weight compensation element counteracts the weight of the float and the discharge element. In this preferred embodiment it is unnecessary to compensate the entire weight of the discharge element and the float by the lift of the float in the liquid food or the foam, because at least a portion of the weight is compensated by the weight compensation element.

Preferably the weight compensation element is embodied as a counterweight and/or as a spring.

Advantageously the float surrounds the discharge element at its end section and the fluid outlet opening is guided through the float. This way a particularly compact embodiment of the discharge element and the float is possible.

Tests of the applicant have shown that, depending on the embodiment and arrangement of the fluid discharge opening at the discharge element, buoyancy and weight forces of the discharge element are created in the liquid food due to the discharge of fluids.

Advantageously the device according to the invention is therefore embodied such that, in addition to the float representing a passive motion element, an active motion element is provided. In an advantageous embodiment this active motion element is embodied such that the device comprises a pressure control unit, which is embodied cooperating with the source such that at least two different pressure values can be predetermined, by which the source releases the foaming means to the discharge element and thus the liquid food can be impinged with the foaming medium with at least two different pressures. Furthermore, the fluid outlet opening is embodied and arranged at the discharge element such that when fluid is discharged a lift or weight force of the discharge element is created in the liquid food when the fluid is being discharged.

By alternating at least two different pressures various lift or weight forces are created so that the upward or downward motion of the discharge element occurs merely by changing the pressure. Such an upward and downward motion is advantageous when at least a partial mixing of the froth and the liquid food is desired during the foaming process.

Advantageously a lift is created, because a subsequently dropping of the discharge element is supported by the weight force of the discharge element.

Therefore, the pressure control unit is advantageously embodied such that automatically a cyclical alternation occurs between at least two different pressure values. The scope of the invention preferably also includes that the user predetermines the desired pressures via an operating unit of the pressure control unit and thus the user indirectly controls the upward and downward motion of the discharge element in the liquid food by predetermining the pressures.

In another preferred embodiment the device according to the invention comprises at least one active motion element, which is embodied such that via the active motion element a relative movement can be predetermined between the discharge element and the container, particularly also an at least vertical relative motion between the discharge element and the container.

Thus, via the active motion element not only a constant distance of the fluid discharge opening can be predetermined in reference to the surface of the liquid or the surface of the foam created but any arbitrary movement of the discharge element and thus also the fluid outlet opening, at least with regard to the elevation inside the container.

Preferably the device further comprises at least one sensor for detecting the surface of the liquid and/or the surface of the foam created as well as a motion control unit. The motion control unit is connected to the sensor and the active motion element such that the movement of the discharge element can be controlled depending on the measurements of the sensor. In this preferred embodiment the manufacturer can therefore predetermine a movement of the discharge element and thus also the fluid outlet opening in reference to the surface of the liquid food and/or the surface of the foam created.

In particular, it is advantageous for the manufacturer to predetermine various forms of motions so that the user, depending on the type of desired foam and/or type, temperature, and viscosity of the liquid food to be foamed, can select a motion program optimized for said purpose by the manufacturer therefore in the motion control and/or that depending on additional sensors, such as temperature sensors for measuring the temperature of the liquid food, an optimized motion program is selected.

Furthermore it is advantageous that via the active motion element additionally a horizontal, particularly a circular motion, can be predetermined between the discharge element and the container. By the horizontal motion of the discharge element a mixture of the liquid food can be achieved in the container and additionally it is ensured that the entire surface area of the liquid food in the container is impinged with foaming medium.

In order to predetermine the movement of the discharge element via the active motion element it is advantageous for the device to comprise a control unit for controlling the active motion element, with the control unit comprising a storage unit for storing a motion process of the active motion element.

A particularly cost-effective and robust embodiment of the device according to the invention is also realized by the use of an active motion element such that the device comprises a discharge element holder, at which the discharge element is arranged in an articulate fashion via the active motion element.

Preferably the device comprises at least one sensor for detecting a manual movement of the discharge element by the user. The sensor is embodied cooperating with the above-mentioned control unit such that in case of a manual movement of the discharge element said movement is saved in the storage unit of the control unit, at least with regard to a vertical movement of the discharge element.

It is particularly advantageous for the movement to be saved both with regard to a vertical motion as well as a horizontal one and/or a combined horizontal and vertical motion of the discharge element. In this advantageous embodiment it is therefore possible that the user or an expert of the manufacturer easily programs a movement of the discharge element, which can later be activated from the storage unit by the user such that the discharge element executes the previously saved movement by the motion element, using the respective control of the control unit.

The fluid outlet opening is preferably arranged at the end section of the discharge element. The discharge element can here be embodied in a tubular fashion for a robust and cost-effective embodiment, so that the fluid outlet opening is located at the lower end of the discharge element.

However, it is particularly advantageous to arrange several fluid outlet openings laterally at the end section of the discharge element as well, and to embody them such that the foaming medium leaves the fluid outlet openings at a predetermined angle in reference to the discharge element.

Preferably here the fluid outlet openings are embodied and arranged such that when the foaming medium is discharged a lift of the discharge element is created. This allows, as described above, to create an upward and downward motion of the discharge element by a change of the pressure.

To facilitate cleaning, the discharge element is preferably arranged at the discharge element holder in a detachable fashion. Here, particularly the detachable fastening of the discharge element at the discharge element holder using a bayonet joint is advantageous.

When fastening the discharge element to a discharge element holder beneficially the discharge element is arranged such that it can be manually pivoted forward and/or backward in reference to the device. This allows an easier arrangement of the container, because first the discharge element is pivoted forward and/or upward and subsequently the discharge element is pivoted back together with the container so that after the return the container is supported on the allocated support surface and the discharge element is at least partially located in the container. It is particularly advantageous for the discharge element to detachably latch in the operating position.

In another advantageous embodiment, a light source is arranged at the discharge element so that during the foaming process the liquid food and/or the foam is illuminated. This allows on the one hand a good control of the foaming process by the user and on the other hand an appealing optic effect is achieved. The light source may represent a conventional light source, such as a light bulb or an LED, however, a light source arranged outside the liquid food is also possible, with its light being conducted via a light guide to the end of the discharge element immersed in the liquid food and here emitting from the light guide.

The discharge element may comprise known materials of automatic coffee makers, such as metal or chromed metal; an embodiment of the discharge element made from glass is also possible. Particularly in a combination with a light source the embodiment of the discharge element made from glass is advantageous to create a particular optic effect.

In order to achieve an optimized frothing advantageously air is fed to the foaming medium. Therefore, in an advantageous embodiment the discharge element comprises an air feeding line which comprises an intake opening outside the area of the discharge element inserted into the liquid food. Via this intake opening air is taken in and fed to the foaming medium at the fluid outlet opening or upstream thereof prior to discharge. This embodiment is particularly advantageous when steam is used as the frothing medium.

The air supply is advantageously embodied such that the air is taken in by the fluid flow using the Venturi-effect.

Additionally, the scope of the invention includes actively supplying air via a fan or a pressurized air generator.

BRIEF DESCRIPTION OF THE DRAWINGS

In the following, additional advantageous features and embodiments of the devices according to the invention are explained in greater detail using an exemplary embodiment. Shown are.

DETAILED DESCRIPTION OF THE PREFERRED EMBODIMENT

Figure 1A:
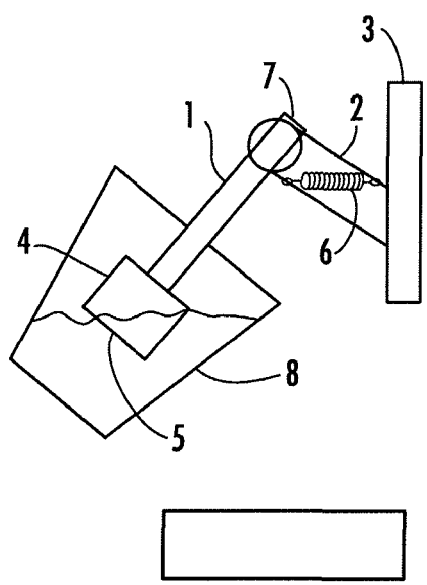
FIG. 1a is a view of an exemplary embodiment of the device according to the invention comprising a float as a passive motion element, with in FIG. 1a a vapor lance being deflected for inserting the container.

The device according to the invention comprises a discharge element embodied as a vapor lance 1, which is arranged, pivotal at least in the vertical direction, via a parallelogram guide 2 at a discharge element holder embodied as a vapor lance holder 3.

A float 4 is arranged at the lower end of the vapor lance 1 surrounding the vapor lance at its lower end section. The vapor lance 1 penetrates the float 4 and comprises at its lower end a vapor outlet opening 5 such that when the vapor lance 1 is positioned vertically steam leaves the vapor lance vertically downwards.

The vapor lance 1 is connected to the vapor generator, not shown, in a liquid conducting fashion such that the steam created in the vapor generator can be discharged via the vapor lance 1 from the vapor outlet opening 5.

In order to partially compensate the weight of the vapor lance 1 and the float 4, the parallelogram guide comprises a weight compensation element 6 embodied as a spring. The weight compensation element 6 counteracts the weight of the float 4 and the vapor lance 1 so that less lift must be created by the float 4, and it is embodied with a lesser volume compared to an embodiment without any weight compensation element 6.

As shown in FIG. 1a, the vapor lance 1 is connected in an articulate fashion via a swivel joint 7 to the parallelogram guide 2 so that the vapor lance can be deflected from the vapor lance holder 3 as shown in FIG. 1a. This allows an easier insertion of the container 8. After the insertion of the container 8 the vapor lance 1 is pivoted back together with the container into the vertical position resulting in the configuration shown in FIG. 1b.

Here, the container 8 is placed upon a support surface and the vapor lance 1 and the float 4 partially immerse into the milk located in the container 8.

Preferably the swivel joint 7 comprises a catch such that the user can snap the vapor lance 1 in the vertical position when swiveling it back. This ensures that in the subsequent foaming process the vapor lance does not veer out of its position, i.e. is deflected to the left in the illustration of FIG. 1b.

In order to deflect the vapor lance, the catch is advantageously embodied as a snap connection of the vapor lance 1 at the swivel joint 7, detachable by a push button.

Figure 1B:
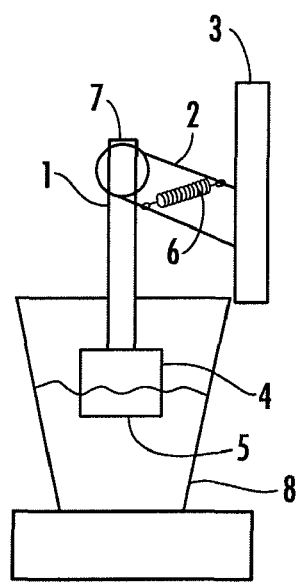
FIG. 1b is a view of the device of FIG. 1a during the foaming process.

After the user has arranged the container as shown in FIG. 1b and has latched the vapor lance in the vertical position the vapor generator is started by the user operating a corresponding start button at the device according to the invention.

Now, the vapor generator creates steam having a predetermined vapor pressure, which is guided into the vapor lance 1 and is discharged from the vapor outlet opening 5 into the milk in the container 8. The vapor lance 1 comprises at its end, positioned at the top in FIG. 1b, an air intake opening so that at this intake opening the passing steam is additionally mixed with air and accordingly the milk is impinged with an air-steam mixture at the vapor outlet opening 5.

The float 4 is embodied such that the vapor outlet opening 5 during the foaming process keeps a predetermined distance from the limit between the foam created and the air located thereabove. During the foaming process the container 8 fills with foam so that due to the lift created by the float 4 the vapor lance 1 is lifted in a vertical motion in reference to the container 8, with the vapor lance 1 here always being positioned vertically due to the parallelogram guide 2.

Figure 1C:
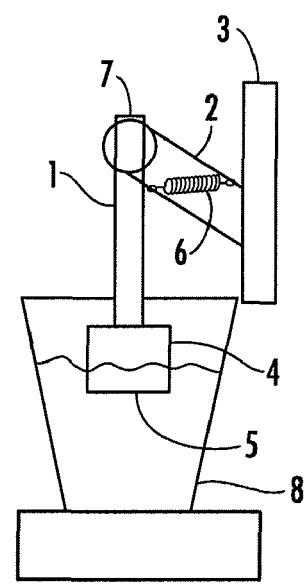
FIG. 1c is a view of the device of FIGS. 1a and 1b after the foaming process has ended.

Thus, as shown in FIG. 1c, the distance of the vapor outlet opening 5 from the limit of the foam created to the air located thereabove in the container 8 is always constant, regardless of the amount of milk froth already created in the container 8.

This way an optimal foaming of the milk is ensured.

In another exemplary embodiment, the device according to the invention shown in FIG. 1 additionally comprises a vapor pressure control unit, not shown. This unit is embodied cooperating with the vapor generator such that two different vapor pressure values can be predetermined by the vapor pressure control unit.

In this exemplary embodiment, the user can select via respective switches on the device according to the invention if he/she wants milk froth, i.e. a layered system with residual milk remaining at the bottom and milk froth being located thereupon or a milk/milk-froth mixture.

If the user selects "milk froth" the foaming process occurs as described above.

If the user selects "milk/milk-froth mixture", however, the vapor pressure control unit controls the vapor generator such that in alternating cycles vapor is discharged with two different vapor pressures from the vapor outlet opening 5 of the vapor lance 1. This way, different lifts are created, while the lift of the float 4 and the weight compensation by the weight compensation element 6 remaining constant. Thus, by the cyclical alternation of the vapor pressure an up and down motion of the vapor lance 1 and the float 4 occurs in the container 8, resulting in the milk and milk froth being mixed.

The invention claimed is:

1. A device for foaming liquid foods in a container (8), comprising a source for a foaming medium and a discharge element (1) for the foaming medium to be at least partially inserted into the container (8), the discharge element (1) being connected to the source in a liquid-conducting fashion and comprising at least one fluid outlet opening (5) for discharging the foaming medium into the container (8), at least one motion element, which cooperates with at least one of the discharge element (1) or with a holder for the container (8) such that at least an elevation of the fluid outlet opening of the discharge element is adjustable in the container (8) via the motion element, the at least one motion element is an active motion element having a relative movement that is predetermined between the discharge element (1) and the container (8), a control unit for controlling the active motion element, and at least one sensor for detecting at least one of a surface of the liquid or a surface of the foam created, with the control unit being connected to the sensor and the active motion element such that the movement of the discharge element (1) can be controlled depending on measurements of the sensor.

2. The device according to claim 1, wherein the source for a foaming medium comprises a vapor generator.

3. The device according to claim 1, further comprising a discharge element holder (3) and the discharge element (1) is arranged in an articulated fashion at the discharge element holder (3), at least with respect to an elevation in reference to the discharge element holder (3), via a parallelogram guide (2) or a linear guide.

4. The device according to at least claim 3, wherein the discharge element (1) is arranged via at least one holder arm at the discharge element holder (3) in an articulated fashion, at least with respect to the elevation, and the discharge element holder (3) comprises at least one weight compensation element (6), which cooperates with the holder arm such that the weight compensation element (6) counteracts a weight of at least one of the discharge element or the holder arm.

5. The device according to at least claim 4, wherein the weight compensation element (6) is at least one of a counterweight or a spring.

6. A device for foaming liquid foods in a container (8), comprising a source for a foaming medium and a discharge element (1) for the foaming medium to be at least partially inserted into the container (8), the discharge element (1) being connected to the source in a liquid-conducting fashion and comprising at least one fluid outlet opening (5) for discharging the foaming medium into the container (8), at least one motion element, which cooperates with at least one of the discharge element (1) or with a holder for the container (8) such that at least an elevation of the fluid outlet opening of the discharge element is adjustable in the container (8) via the motion element, the discharge element (1) is arranged in an articulated fashion on a discharge element holder (3), at least with respect to an elevation in reference to the discharge element holder (3), via a parallelogram guide (2) or a linear guide, the discharge element (1) is arranged via at least one holder arm of the discharge element holder (3) in an articulated fashion, and the discharge element holder (3) comprises at least one weight compensation element (6), which cooperates with the holder arm such that the weight compensation element (6) counteracts a weight of at least one of the discharge element or the holder arm, and the at least one motion element comprises a float (4) to create a lift when the float is immersed in the liquid food, and the float (4) is arranged on the discharge element (1).

7. The device according to claim 6, wherein the float (4) is embodied such that during the foaming process the fluid outlet opening (5) of the discharge element (1) is always arranged for a predetermined fluid pressure of the foaming medium in an approximately constant, predetermined distance in reference to a limit between the liquid food in the container (8) and the foam created or a limit between the foam created and the air located thereabove.

8. The device according to claim 6, wherein the float (4) surrounds the discharge element (1) at an end section thereof with the fluid outlet opening (5) being guided through the float (4).

9. The device according to claim 4, further comprising a pressure control unit for the source, which cooperates with the source such that at least two different pressure values can be predetermined, at which the liquid food can be impinged with the foaming medium via the discharge element (1).

10. The device according to claim 1, wherein the relative movement of the active motion element is with respect to at least one of an elevation of the discharge element in the container (8) or the fluid outlet opening in the container (8).

11. The device according to claim 1, wherein the control unit comprises a storage unit for storing the movement process of the active motion element.

12. The device according to claim 1, wherein the active motion element is embodied such that via the active motion element additionally a horizontal motion between the discharge element (1) and the container (8) can be predetermined.

13. The device according to claim 1, further comprising a discharge element holder (3) at which the discharge element (1) is arranged in an articulated fashion via the active motion element.

14. The device according to claim 1, further comprising at least one motion sensor for detecting a manual movement of the discharge element (1), which cooperates with the control unit such that in case of a manual movement of the discharge element (1) the motion can be saved in the storage unit of the control unit, with respect to at least one of a vertical motion of the discharge element (1) with respect to a horizontal or a combined horizontal and vertical movement of the discharge element (1).

15. The device according to claim 1, wherein the discharge element (1) comprises several fluid outlet openings, which are embodied and arranged at the discharge element (1) such that the foaming medium is discharged at a predetermined angle in reference to the discharge element (1) at the fluid outlet openings.

16. The device according to claim 1, wherein the discharge element (1) is arranged at the discharge element holder (3) in a detachable fashion.

* * * * *